United States Patent
Thompson et al.

(10) Patent No.: US 10,207,795 B2
(45) Date of Patent: Feb. 19, 2019

(54) ARRANGEMENT FOR MOVING A WING TIP DEVICE BETWEEN A FLIGHT CONFIGURATION AND A GROUND CONFIGURATION

(71) Applicant: AIRBUS OPERATIONS LIMITED, Bristol (GB)

(72) Inventors: Robert Ian Thompson, Bristol (GB); Nick Livings, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 218 days.

(21) Appl. No.: 15/044,370

(22) Filed: Feb. 16, 2016

(65) Prior Publication Data

US 2016/0251075 A1 Sep. 1, 2016

(30) Foreign Application Priority Data

Feb. 17, 2015 (GB) .................................. 1502663.6

(51) Int. Cl.
*B64C 13/06* (2006.01)
*B64C 23/06* (2006.01)
*B64C 3/56* (2006.01)

(52) U.S. Cl.
CPC .............. *B64C 23/072* (2017.05); *B64C 3/56* (2013.01); *Y02T 50/164* (2013.01)

(58) Field of Classification Search
CPC ........ B64C 3/56; B64C 23/065; B64C 23/072
See application file for complete search history.

(56) References Cited

U.S. PATENT DOCUMENTS

| 2,289,224 | A | * | 7/1942 | Anderson | ................. B64C 3/56 244/49 |
| 3,785,594 | A | | 1/1974 | Lee | |
| 4,725,026 | A | | 2/1988 | Krafka et al. | |

(Continued)

FOREIGN PATENT DOCUMENTS

| GB | 475500 A | 11/1937 |
| GB | 1339331 A | 12/1973 |
| WO | 2011051699 A2 | 5/2011 |

OTHER PUBLICATIONS

Search Report issued in Great Britain Application No. 1502663.6 dated Jul. 15, 2015.

(Continued)

*Primary Examiner* — Philip J Bonzell
(74) *Attorney, Agent, or Firm* — Nixon & Vanderhye P.C.

(57) ABSTRACT

An aircraft comprises a wing, a wing tip device at the tip of the wing and an actuator. The actuator is arranged to effect movement of the wing tip device between a flight configuration for use during flight and a ground configuration in which the wing tip device is moved away from the flight configuration such that the span of the aircraft is reduced. The aircraft comprises a carriage guide, such as a rail, fixed relative to the wing, and a carriage arranged to move along the carriage guide as the wing tip device moves between the flight and ground configurations. The wing tip device is fixed relative to the carriage such that the path of the wing tip device, during movement of the wing tip device, between the flight and the ground configurations, is defined by the shape of the carriage guide.

10 Claims, 13 Drawing Sheets

(56) References Cited

U.S. PATENT DOCUMENTS

| | | | | |
|---|---|---|---|---|
| 4,778,129 | A * | 10/1988 | Byford | B64C 3/56 |
| | | | | 244/49 |
| 5,310,138 | A * | 5/1994 | Fitzgibbon | B64C 3/56 |
| | | | | 244/49 |
| 9,139,285 | B2 * | 9/2015 | Schlipf | B64C 3/56 |
| 9,296,469 | B2 * | 3/2016 | Santini | B64C 3/56 |
| 9,783,284 | B2 * | 10/2017 | Townsend | B64C 3/56 |
| 2005/0133672 | A1 | 6/2005 | Irving et al. | |
| 2012/0228424 | A1 | 9/2012 | Parker | |
| 2013/0001367 | A1 | 1/2013 | Boer et al. | |
| 2013/0056579 | A1 * | 3/2013 | Schlipf | B64C 3/56 |
| | | | | 244/49 |
| 2013/0292508 | A1 | 11/2013 | Fox | |
| 2013/0313356 | A1 * | 11/2013 | Santini | B64C 3/56 |
| | | | | 244/49 |
| 2014/0175217 | A1 | 6/2014 | Ishihara et al. | |
| 2015/0336657 | A1 * | 11/2015 | Townsend | B64C 3/56 |
| | | | | 244/49 |

OTHER PUBLICATIONS

Search Report dated Jun. 30, 2016 in European Patent Application No. 16155944.

\* cited by examiner

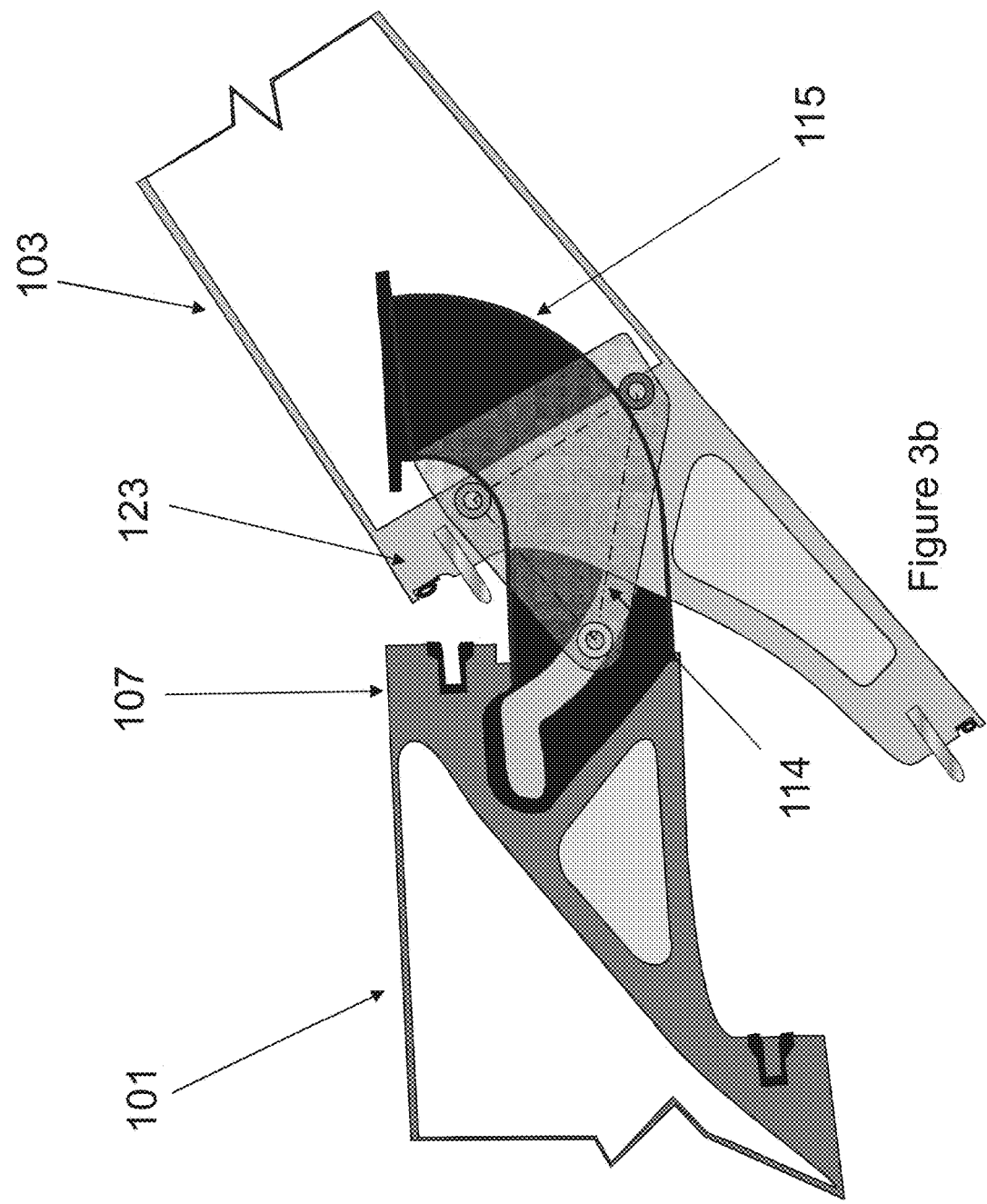

ARRANGEMENT FOR MOVING A WING TIP DEVICE BETWEEN A FLIGHT CONFIGURATION AND A GROUND CONFIGURATION

RELATED APPLICATIONS

The present application claims priority from Great Britain Application Number 1502663.6, filed Feb. 17, 2015, the disclosure of which is hereby incorporated by reference herein in its entirety.

BACKGROUND OF THE INVENTION

The present invention relates to aircraft and more specifically, but not exclusively, to passenger aircraft with wing tip devices.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wing tip devices which may be folded to reduce the span of the aircraft on the ground (compared to when the aircraft is configured for flight). The wing tip devices may, for example, be configurable between: (i) a flight configuration for use during flight and (ii) a ground configuration for use during ground-based operations, in which ground configuration the wing tip device is moved away from the flight configuration such that the span of the aircraft is reduced.

It may be desirable for the movement between the flight and the ground configurations to comprise both a rotational component of movement of the wing tip device, and a translational component of movement of the wing tip device relative to the wing. The rotational movement typically allows the wing tip device to be rotated upwards or downwards to reduce the span of the aircraft, whereas the translational component may, for example, enable the wing tip device to disengage from a locking arrangement.

There are technical challenges in providing a practical arrangement for providing such movement. Amongst the issues to be addressed are: the problem of providing a safe and reliable arrangement to enable such movement without impacting unduly on the design of the wing; and the problem of providing a compact and lightweight drive to effect the movement of the wing tip device. The present invention seeks to mitigate at least some of the above-mentioned problems.

SUMMARY OF THE INVENTION

According to a first aspect of the invention, there is provided an aircraft comprising a wing, a wing tip device at the tip of the wing and an actuator, the actuator being arranged to effect movement of the wing tip device between: (i) a flight configuration for use during flight and (ii) a ground configuration for use during ground-based operations, in which ground configuration the wing tip device is moved away from the flight configuration such that the span of the aircraft is reduced, characterised in that the aircraft comprises: a carriage guide, fixed relative to the wing, a carriage arranged to move along the carriage guide as the wing tip device moves between the flight and ground configurations, wherein the carriage carries the wing tip device and the wing tip device is fixed relative to the carriage, such that the path of the wing tip device, during movement of the wing tip device, between the flight and the ground configurations, is defined by the shape of the carriage guide.

Since the wing tip device is fixed relative to the carriage, the path of the wing tip device is defined by the shape of the carriage guide. This facilitates a relatively simple arrangement for effecting a particular path of movement of the wing tip device.

The carriage guide may be shaped such that the movement of the wing tip device between the flight and the ground configurations comprises both a rotational component of movement of the wing tip device, and a translational component of movement of the wing tip device.

The movement from the flight configuration to the ground configuration preferably comprises an initial phase of motion. The initial phase of motion preferably begins with the wing tip device in the flight configuration. The initial phase of motion preferably comprises only a translational component of movement of the wing tip device. The initial phase of motion preferably finishes before the wing tip device is in the ground configuration (for example it may finish with the wing tip device in an intermediate configuration). The initial phase of motion may be arranged to unlock the wing tip device from a locking system. For example, the wing tip device may be held on a series of spigots and the initial phase of motion may be arranged to translate the wing tip device along, and off, the spigots. Alternatively or additionally, the initial phase of motion may be arranged to translate the wing tip device away from the wing to unseal a sealing arrangement. For example there may be a sealing arrangement between the wing and the wing tip device in the flight configuration. A rotational component of movement of the wing tip device, and/or a sliding motion at the seal interface, may lead to premature wear of the sealing arrangement, whereas providing a translational movement of the wing tip device has been found to be more effective in preserving the life of the seal.

In some embodiments of the invention, the carriage guide comprises a proximal end and a distal end. The proximal end is preferably nearest the wing and the distal end is preferably farthest from the wing. The distal end may be outboard of the tip of the wing. The carriage guide preferably has a straight section at its proximal end. A curved section preferably extends from the straight section towards (and more preferably to) the distal end.

The carriage guide may comprise an upper guide. The carriage guide may comprise a middle guide. The carriage guide may comprise a lower guide. The middle guide is located between the upper and the lower guides. The carriage preferably comprises corresponding upper, middle and/or lower contacts for moving along those respective guides. The contacts are preferably rolling-contacts. The contacts may comprise one or more wheels. The provision of three (i.e. upper, lower and middle) guides and three corresponding (i.e. upper, lower and middle) contacts for moving along those guides, has been found to be especially beneficial because it tends to constrain the movement of the carriage as it moves along the carriage guide such that the carriage follows the shape of the guide.

In some embodiments, the upper, lower and/or middle guides may be separate elements (for example, three separate rails). In some other embodiments, the carriage guide may comprise a single rail; the upper surface of the rail may form the upper guide, and the lower surface of the rail may form the lower guide. Rails may also be known as 'tracks' in some embodiments. The single rail may comprise a slot located between the upper and lower surfaces; the slot may form the middle guide. Such an arrangement is beneficial because it can provide the three guides in a single structure.

The actuator may be coupled to the wing tip device at a coupling. The coupling may be referred to as an actuated location on the wing tip device. The actuator may be such that the coupling, during movement of the wing tip device between the flight configuration and the ground configuration, follows a linear path relative to the actuator. For example, the actuator may be a linear actuator. The locus of the coupling (during movement of the wing tip device between the flight configuration and the ground configuration) is preferably dependent on the shape of the carriage guide, and more preferably only dependent on the shape of the carriage guide. Such an arrangement is beneficial because it makes it relatively straightforward to replace the actuator (because the nature of the actuator per se does not influence the locus of the coupling).

The wing may comprise a multiplicity of ribs. The wing may comprise an end rib at the tip of the wing. The wing tip device (in the flight configuration) may be adjacent the end rib. For example, the root of the wing tip device may comprise a root rib; the root rib of the wing tip device and the end rib of the wing tip may be adjacent (and in some embodiments they may abut) when the wing tip device is in the flight configuration. The shapes of the end rib and the root rib may be complementary.

The end rib may comprise an upper edge (in the vicinity of the upper wing skin). The end rib may comprise a lower edge (in the vicinity of the lower wing skin). The root rib of the wing tip device may also comprise corresponding upper and lower edges. In some embodiments, the lower edge may be directly below the upper edge. The upper and lower edges may be in substantially the same spanwise location. For example, the edges may lie in a plane that is perpendicular to the plane of the wing (typically vertical, but may be off-vertical for a wing with dihedral for example).

In some other embodiments, at least part, of the lower edge of the end rib may be recessed (in a spanwise direction) relative to the upper edge of the end rib. Such an arrangement may be beneficial in terms of distributing loads generated as a result of bending moments (from the wing tip device) being reacted into the end rib. For example, when the wing tip device is in the flight configuration, the aerodynamic loads on the wing tip device may cause a bending moment to be reacted into the end rib (for example via the carriage guide). The above-described arrangement may enable a beneficial stress distribution within that end rib. In particular, having the upper and lower edges of the rib (and associated locking/locating apparatus) relatively far apart has been found to be beneficial from a stress perspective.

in the flight configuration, the wing tip device may be locked relative to the wing tip. The wing tip device may comprise a plurality of locks for locking the wing tip device relative to the wing tip. A first lock may be located at the upper edge. A second lock may be located at the lower edge.

In preferred embodiments of the invention the wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of the wing. The leading edge of the wing tip device is preferably a continuation of the leading edge of the wing. There is preferably a smooth transition from the wing to the wing tip device. It will be appreciated that there may be a smooth transition, even where there are changes in sweep or twist at the junction between the wing and wing tip device. However, there are preferably no discontinuities at the junction between the wing and wing tip device. The upper and the lower surfaces of the wing tip device may be continuations of the upper and lower surfaces of the wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

In the flight configuration, the span of the aircraft may exceed an airport compatibility gate limit. In the ground configuration the span of the aircraft is preferably reduced such that the span (with the wing tip device in the ground configuration) is less than, or substantially equal to, the airport compatibility gate limit.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted and preferably underwing, engines.

According to another aspect of the invention there is provided an assembly for attaching a wing tip device to an aircraft wing, the wing tip device being moveable between: (i) a flight configuration for use during flight and (ii) a ground configuration for use during ground-based operations, in which ground configuration the wing tip device is moved away from the flight configuration such that the span of the aircraft is reduced, wherein the assembly comprises: a carriage guide, for fixing relative to the wing, and a carriage arranged to move along the carriage guide as the wing tip device moves between the flight and ground configurations, wherein wing tip device is fixable relative to the carriage, such that the path of the wing tip device, during movement of the wing tip device, between the flight and the ground configurations, is defined by the shape of the carriage guide.

According to another aspect of the invention, there is provided a method of moving a wing tip device between a flight configuration and a ground configuration, wherein the method comprises the step of: moving a carriage along a carriage guide, the wing tip device being fixed relative to the carriage such that the path of the wing tip device, during movement of the wing tip device between the flight and the ground configurations, is defined by the shape of the carriage guide.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIGS. 3a to 3c are schematic sectional side views of the wing and wing tip device according to a second embodiment of the invention, during movement from the flight configuration to the ground configuration

DETAILED DESCRIPTION

Figure 1A:
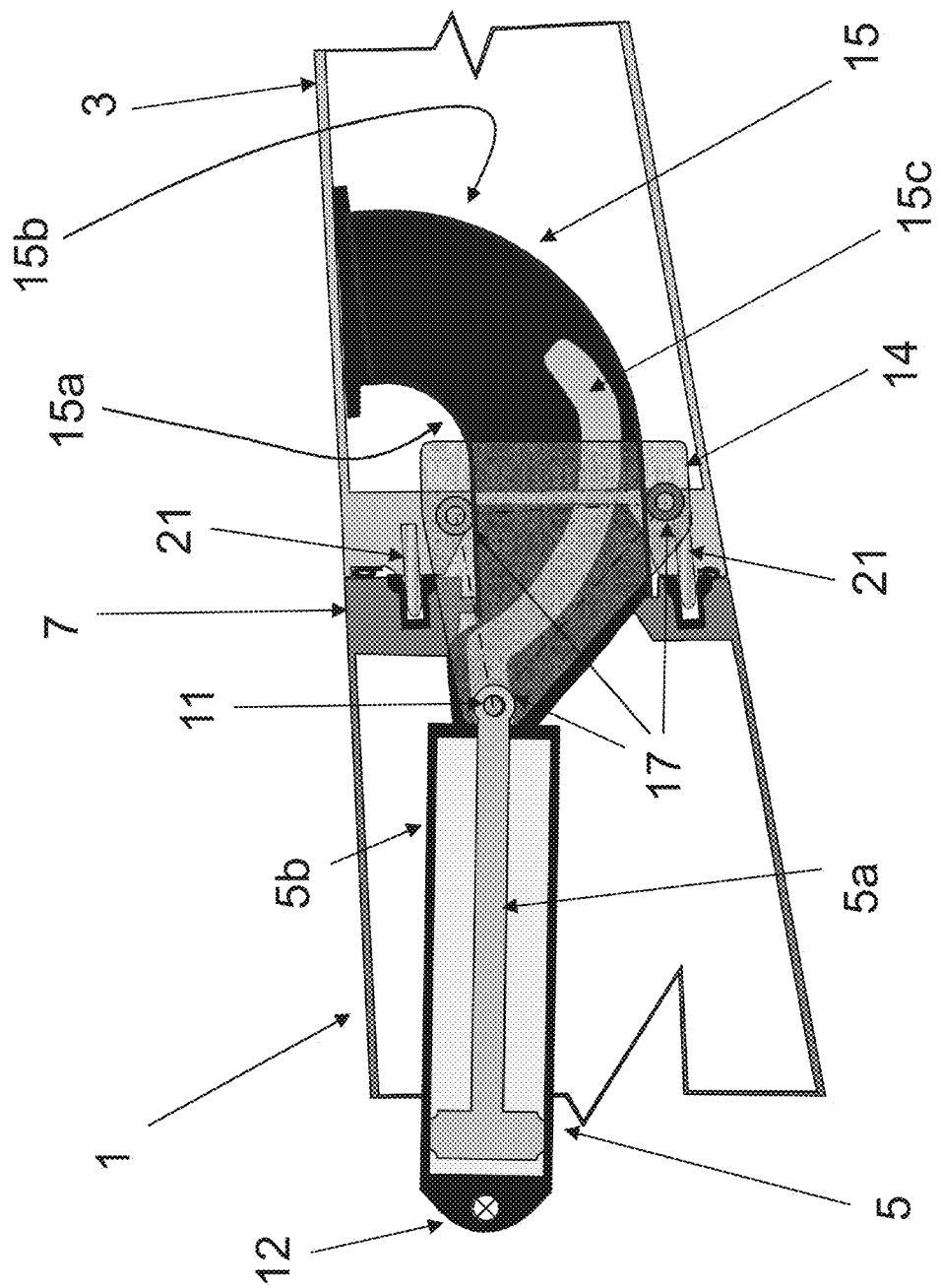
FIGS. 1a to 1h are schematic sectional side views of the wing and wing tip device according to a first embodiment of the invention, during movement from the flight configuration to the ground configuration.
Figure 2:
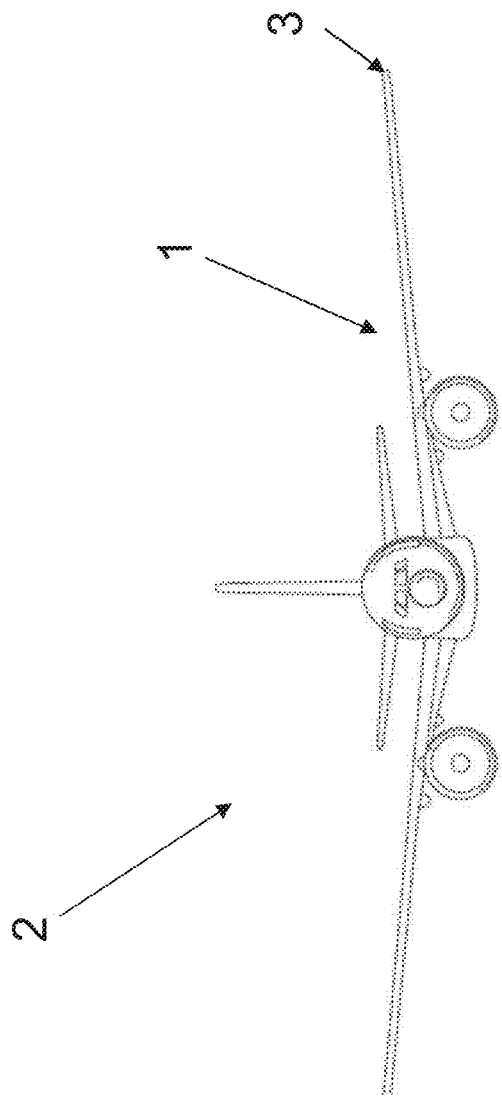
FIG. 2 shows a plan view of the aircraft with the wing and wing tip device of FIGS. 1a to 1h.

FIG. 1a shows a schematic side view of a wing 1 and wing tip device 3 according to a first embodiment of the invention. The wing tip device 3 is in the form of a planar wing tip extension 3, but for the sake of clarity only the root portion of the wing tip device is shown in FIG. 1a. The wing 1 and wing tip device 3 are on the aircraft 2 shown in FIG. 2.

Figure 1B:
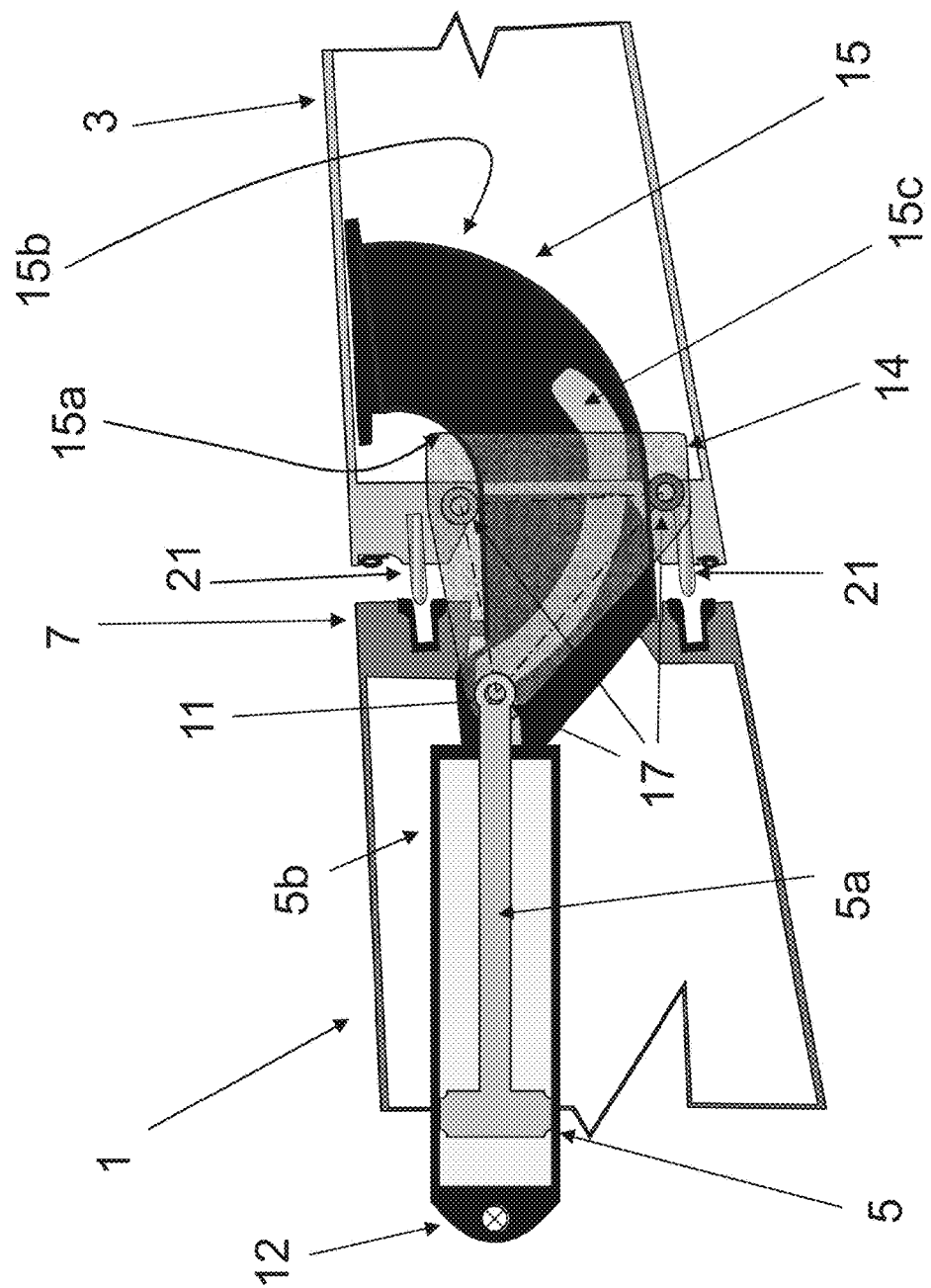
Figure 1C:
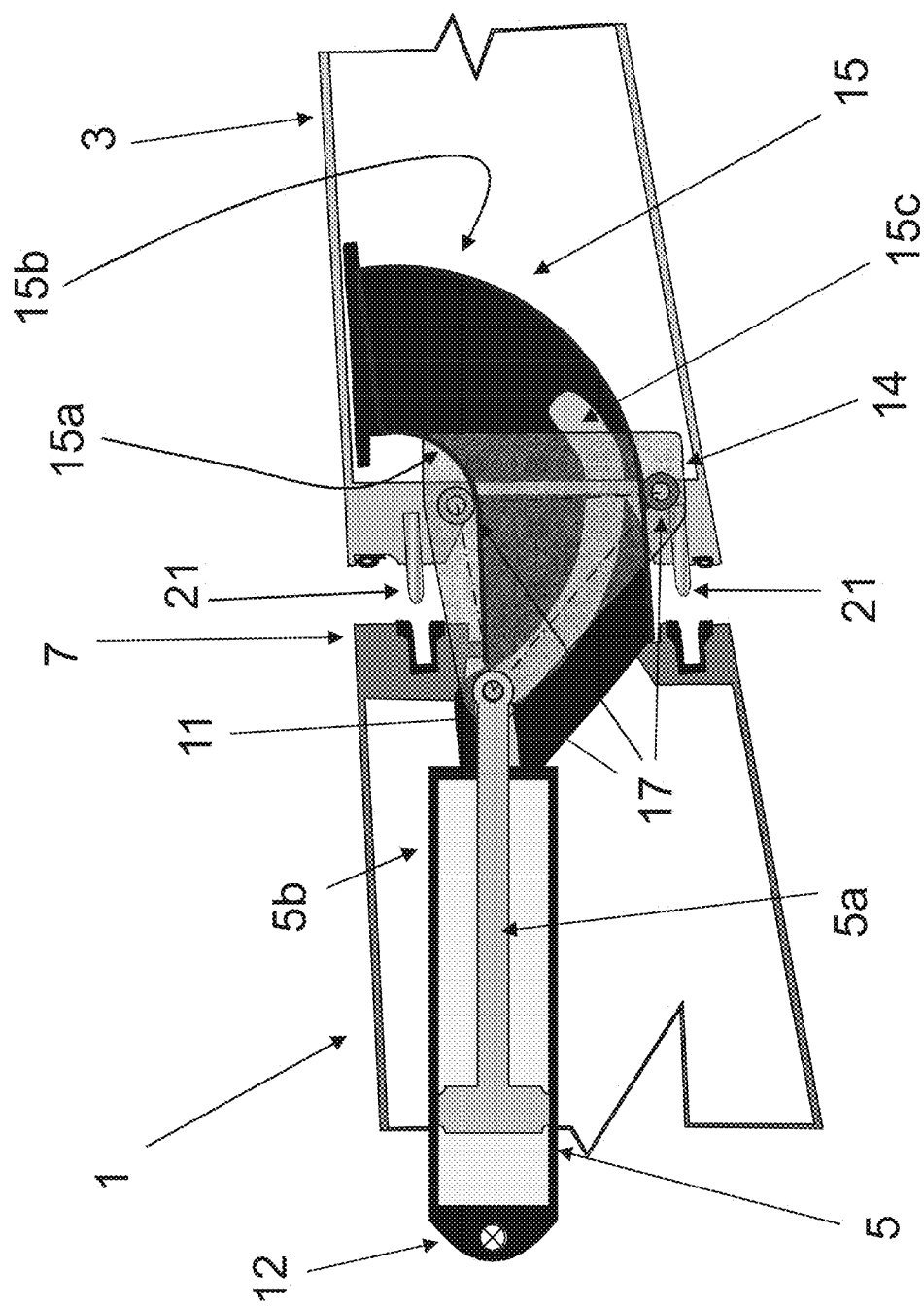
Figure 1D:
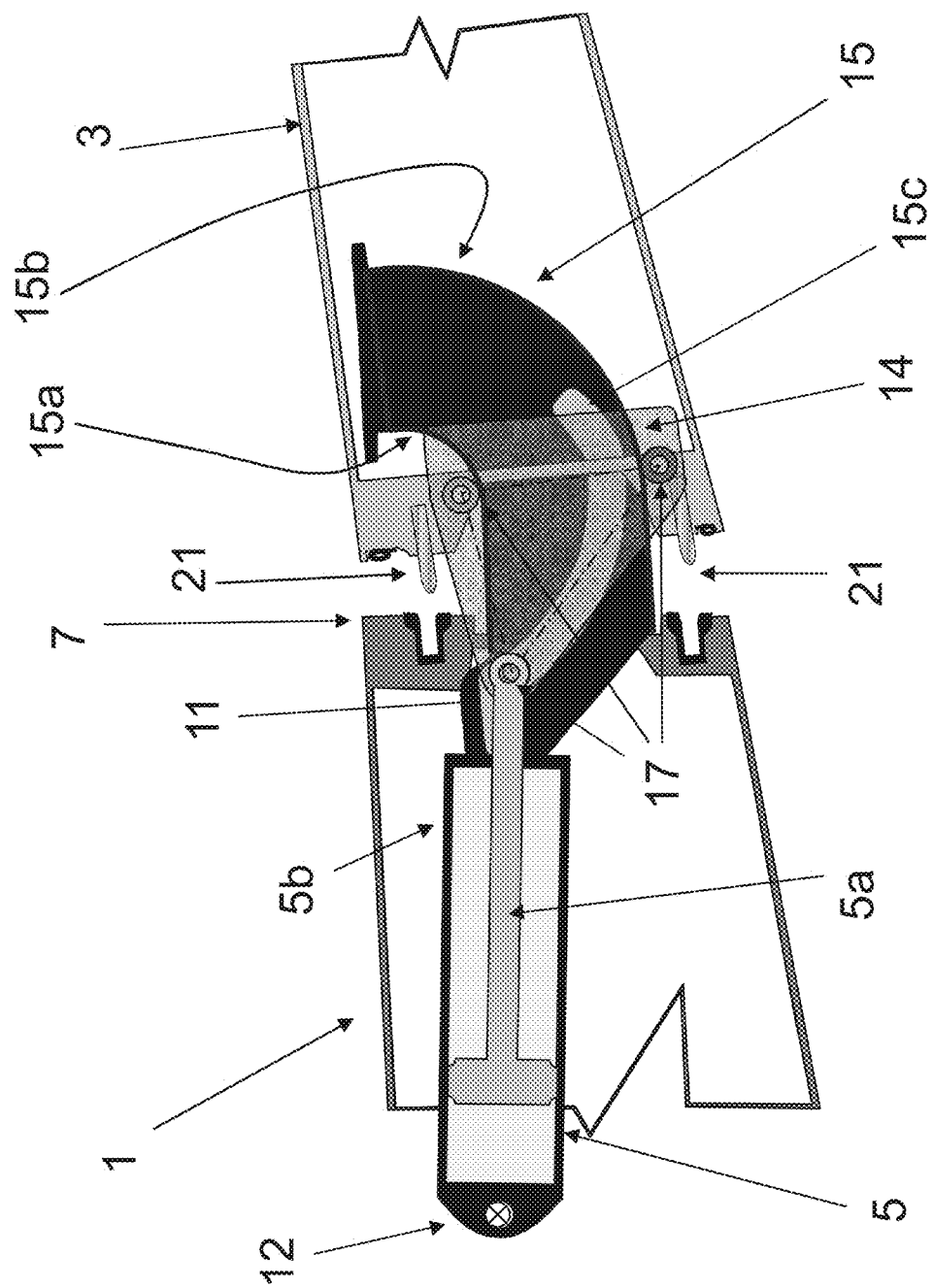
Figure 1E:
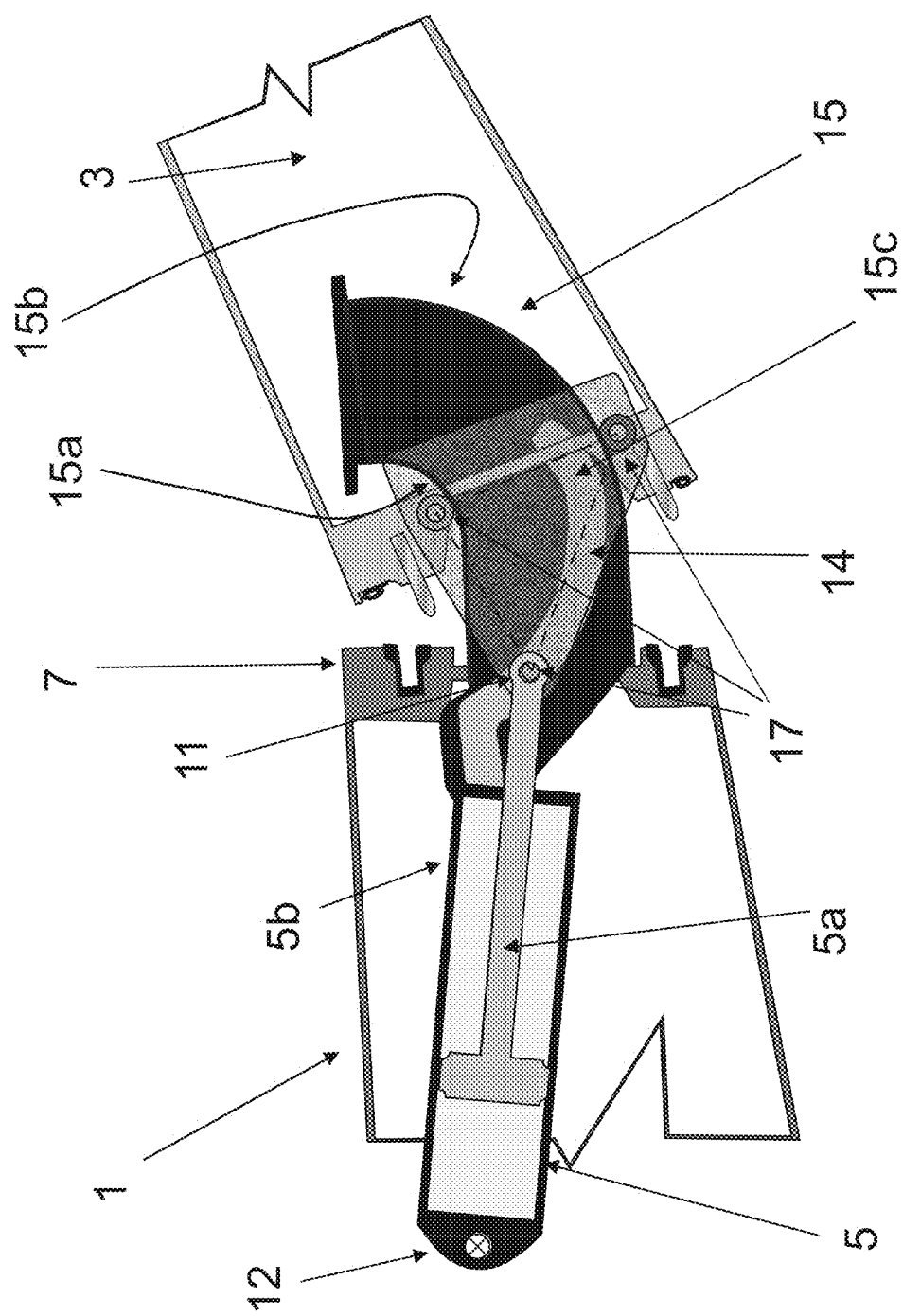
Figure 1F:
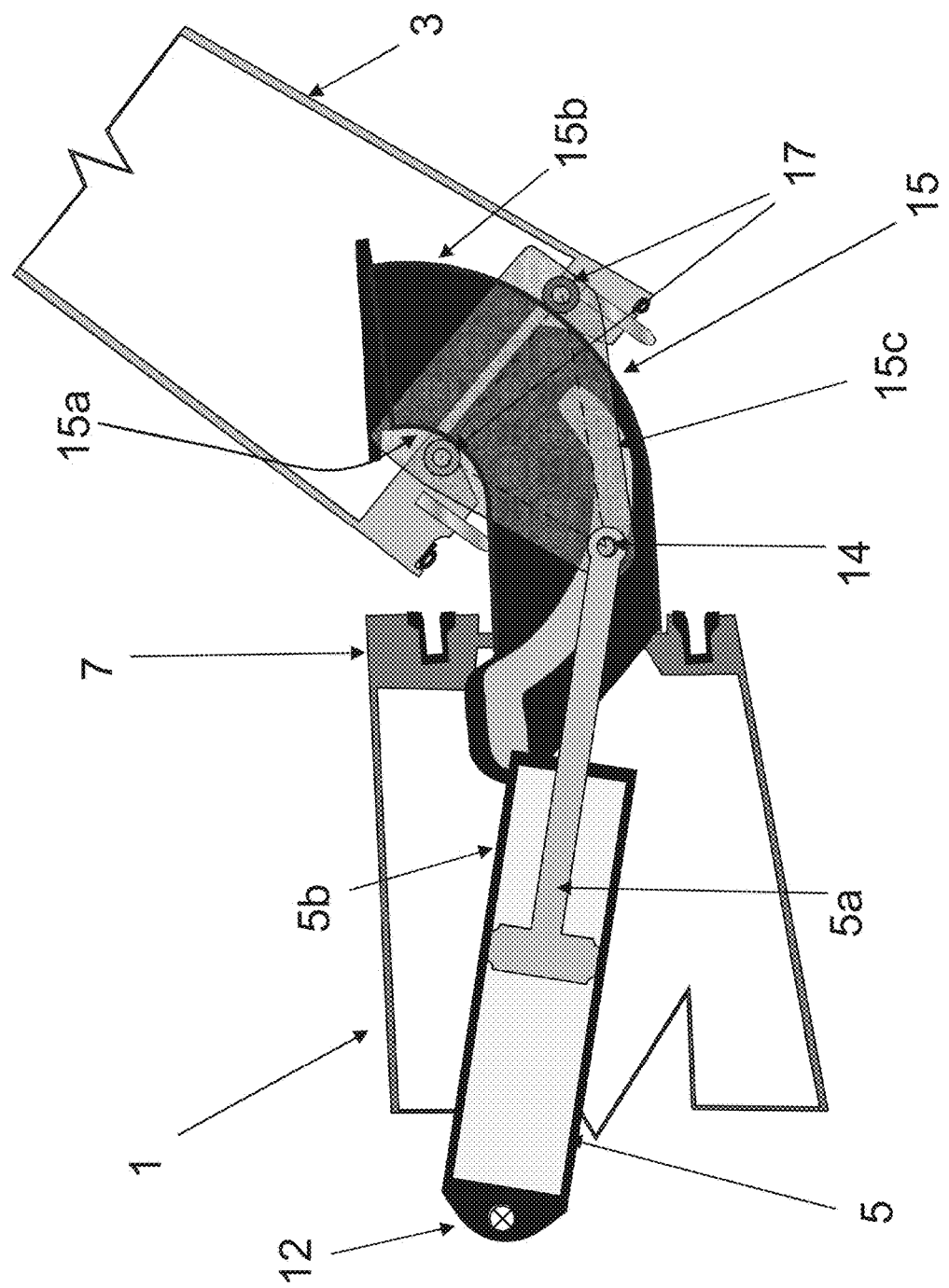
Figure 1G:
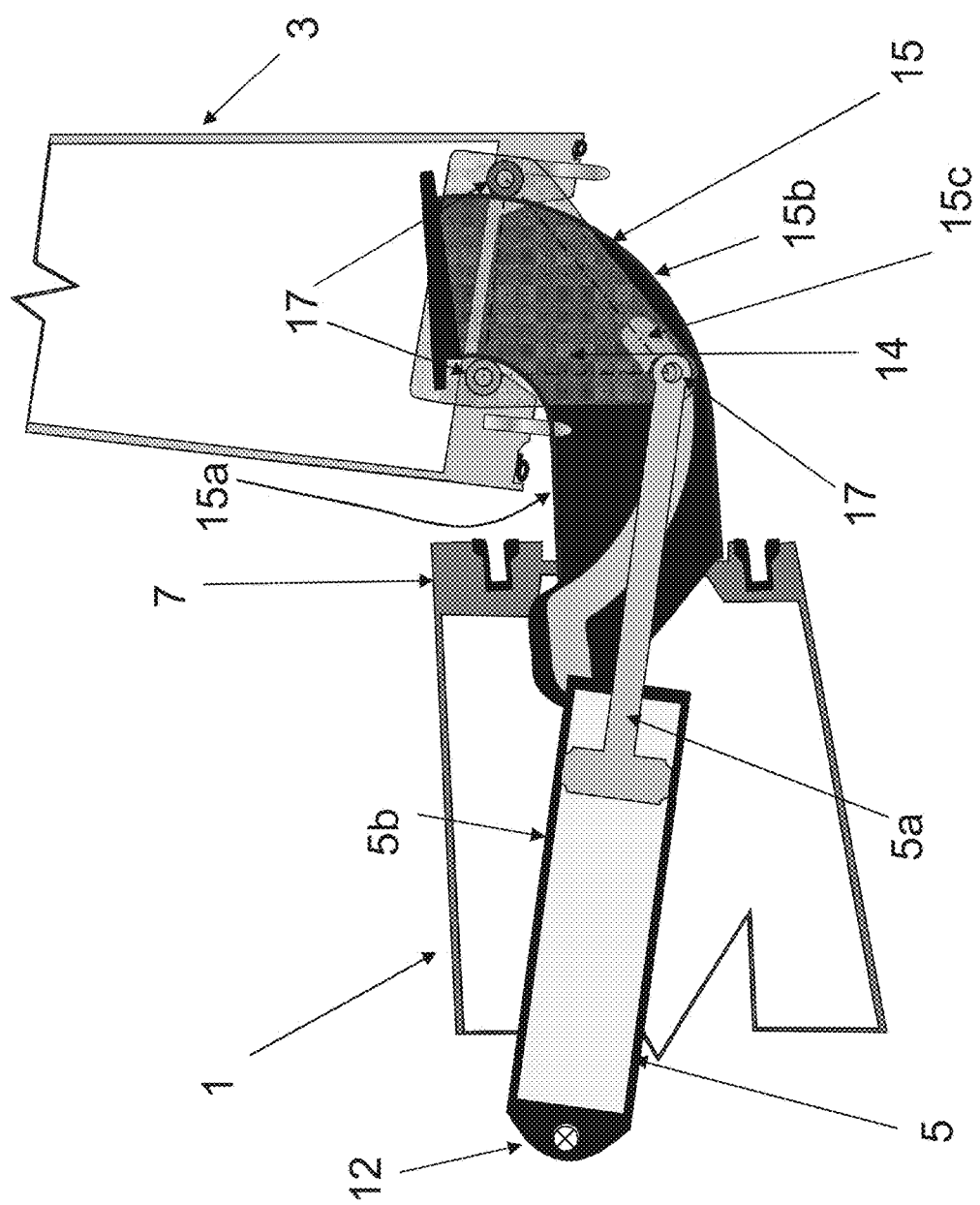
Figure 1H:
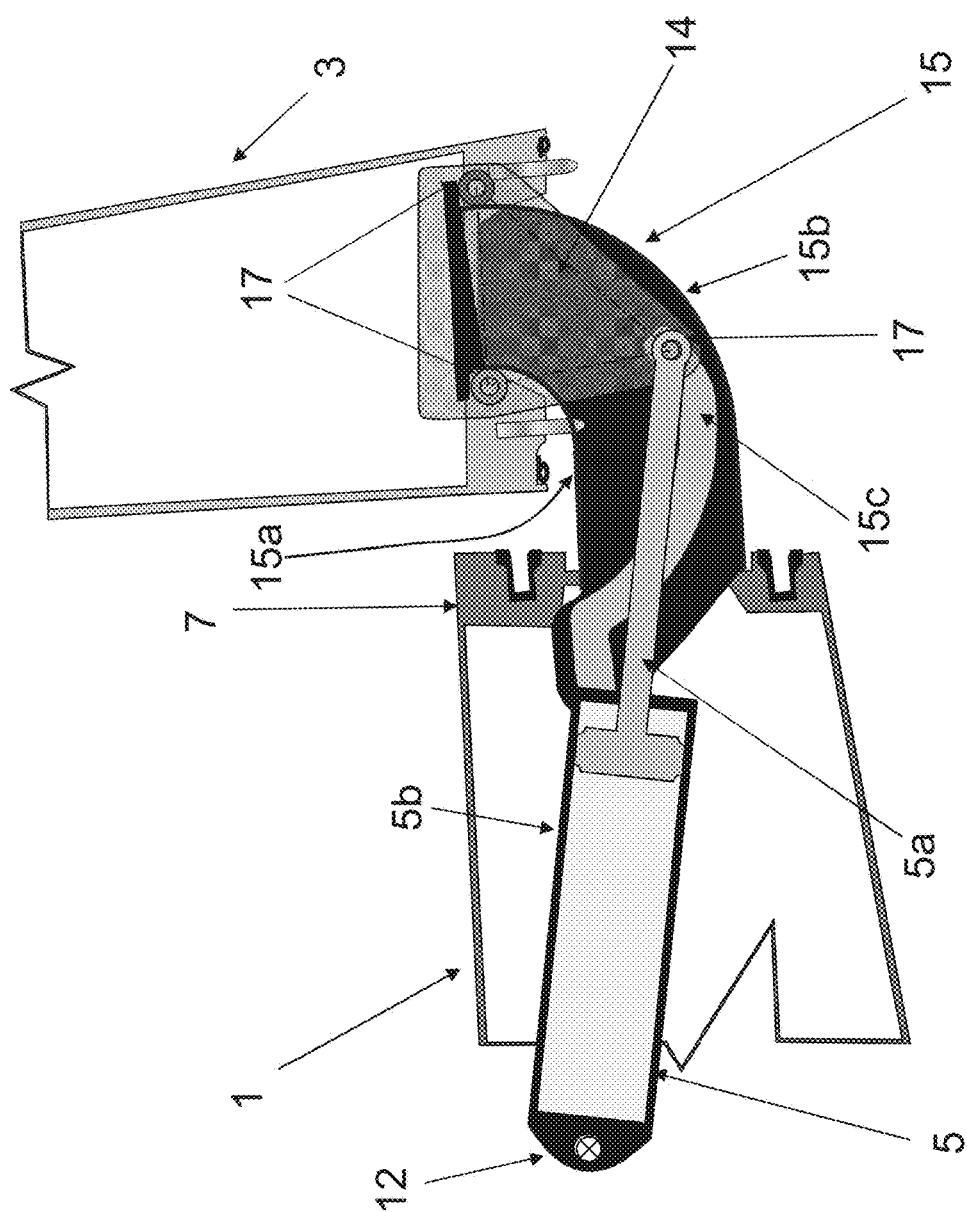

The wing tip device 3 is moveable from a flight configuration (shown in FIGS. 1a and 2) to a ground configuration (shown in FIG. 1h). In the ground configuration, the wing tip device 3 is moved such that the span of the aircraft is reduced (relative to the flight configuration). This enables the aircraft to have a relatively large span during flight, whilst still complying with airport gate limits, safe taxiway usage etc., on the ground.

A linear actuator 5 effects movement of the wing tip device between these two configurations. The actuator 5 comprises a piston rod 5a that is extendable/retractable relative to a cylindrical housing 5b. The actuator 5 is located in the tip of the wing 1. The actuator 5 is coupled, at one end to a carriage 14 via a coupling 11. At the other end, the actuator is coupled to the wing about a pin joint 12.

The carriage 14 is moveable along a carriage guide 15. The carriage guide is in the form of rail 15. The rail 15 is attached, at its proximal end, to the end rib 7 of the aircraft wing 1. The rail 15 is a one-piece structure comprising an initial straight region extending from the proximal end, and an outboard curved region. The rail 15 comprises an upper guide surface 15a along its upper edge and a lower guide surface 15b along its lower edge. A slot 15c is located in the structure of the rail, between the upper and lower surfaces 15a, 15b.

The carriage 14 comprises three rolling contacts, each being in the form of a wheel 17, spaced in a triangular formation, for travelling along the upper and lower surfaces, and the slot. As will be apparent from the description with reference to FIGS. 1a to 1h (below), the shape of the rail 15 defines the path of the carriage 14. The wing tip device 3 is connected to the carriage 14 and fixed relative thereto. The wing tip device 3 moves in dependence on the movement of the carriage 14. Accordingly, the path of the wing tip device 3 as the carriage 14 moves along the rail 15, is also defined by the shape of the rail 15.

FIGS. 1a to 1h show the wing tip device 3 during movement from the flight configuration to the ground configuration, as well as the movement of the actuator 5, and the carriage 14. Reference to these Figures will now be made:

In FIG. 1a the wing tip device 3 is in the flight configuration. Accordingly, the upper and lower wing skin surfaces, and the leading and trailing edges (not shown), of the wing tip device 3 and the wing 1, are continuations of one another. A sealing arrangement (not shown) is also present between the upper and lower surfaces of the wing 1 and wing tip device 3, to prevent any leakage flow during use. The wing tip device 3 is held in position on the wing 1 via a series of spigots 21.

When the actuator 5 is activated, the rod 5a extends out of the cylindrical housing 5b. The actuator 5 exerts an actuation force at the coupling 11 thereby pushing the carriage along the rail 15.

As is apparent from FIG. 1a to 1c, during an initial phase of motion, starting from the flight configuration, the carriage translates along the rail (approximately parallel to the plane of the wing), because the upper and lower surfaces 15a, 15b, and the slot 15c are substantially straight. Having this initial phase of movement comprising only a translational movement has been found to be particularly attractive as it enables the wing tip device 3 to clear the sealing arrangement without causing undue wear to the sealing arrangement, and it also enables the wing tip device 3 to be unlocked from the wing 1.

At the position in FIG. 1d, the wheels 17 on the carriage 14 have each reached the start of a respective curved section of the rail 15. Accordingly, as the actuator 5 continues to extend, the carriage 14 begins to rotate (about a notional centre of rotation located outside the aircraft). The downward movement of the coupling 11 between the carriage and the actuator 5 is accommodated by the actuator pivoting about the pin joint 12.

FIGS. 1e to 1g shows the movement of the wing tip device, as it moves towards the ground configuration. As the carriage moves along the rail it continues to rotate, thereby bringing the wing tip device towards a vertical orientation.

In FIG. 1h the wing tip device is in the ground configuration. At this point, the actuator is near maximum extension, and at least one of the carriage wheels abuts a respective stop at the end of the rail. The wing tip device is substantially vertical, and the span of the aircraft is reduced relative to the flight configuration.

As will be appreciated from the above-description, since the wing tip device 3 is connected to the carriage 14 and fixed relative thereto, the wing tip device 3 moves in dependence on the movement of the carriage 14. Accordingly, the path of the wing tip device 3 as the carriage 14 moves along the rail 15, is also defined by the shape of the rail 15. This facilitates a relatively simple arrangement for effecting a particular path of movement of the wing tip device 3. If, in an alternative embodiment, it were desirable for the initial translational movement to be greater for example, the shape of the track could be altered to include a longer initial straight section. Alternatively, if it were desirable to change the rotational movement (for example to effect a tighter rotation of the tip device), the shape of the track could be altered to decrease the radius of curvature of the slot and the distal end of the rail.

It will be appreciated from the above-description that the first embodiment facilitates an 'out and up' movement of the wing tip device, whilst using a linear actuator. A benefit of the first embodiment is that the nature of the actuator per se does not influence the locus of the coupling between the actuator and the carriage (that locus being defined instead by the shape of the rail). This makes it relatively straightforward to replace the actuator, if and when needed.

Movement from the ground configuration to the flight configuration is the reverse of the above-mentioned movement.

Figure 3A:
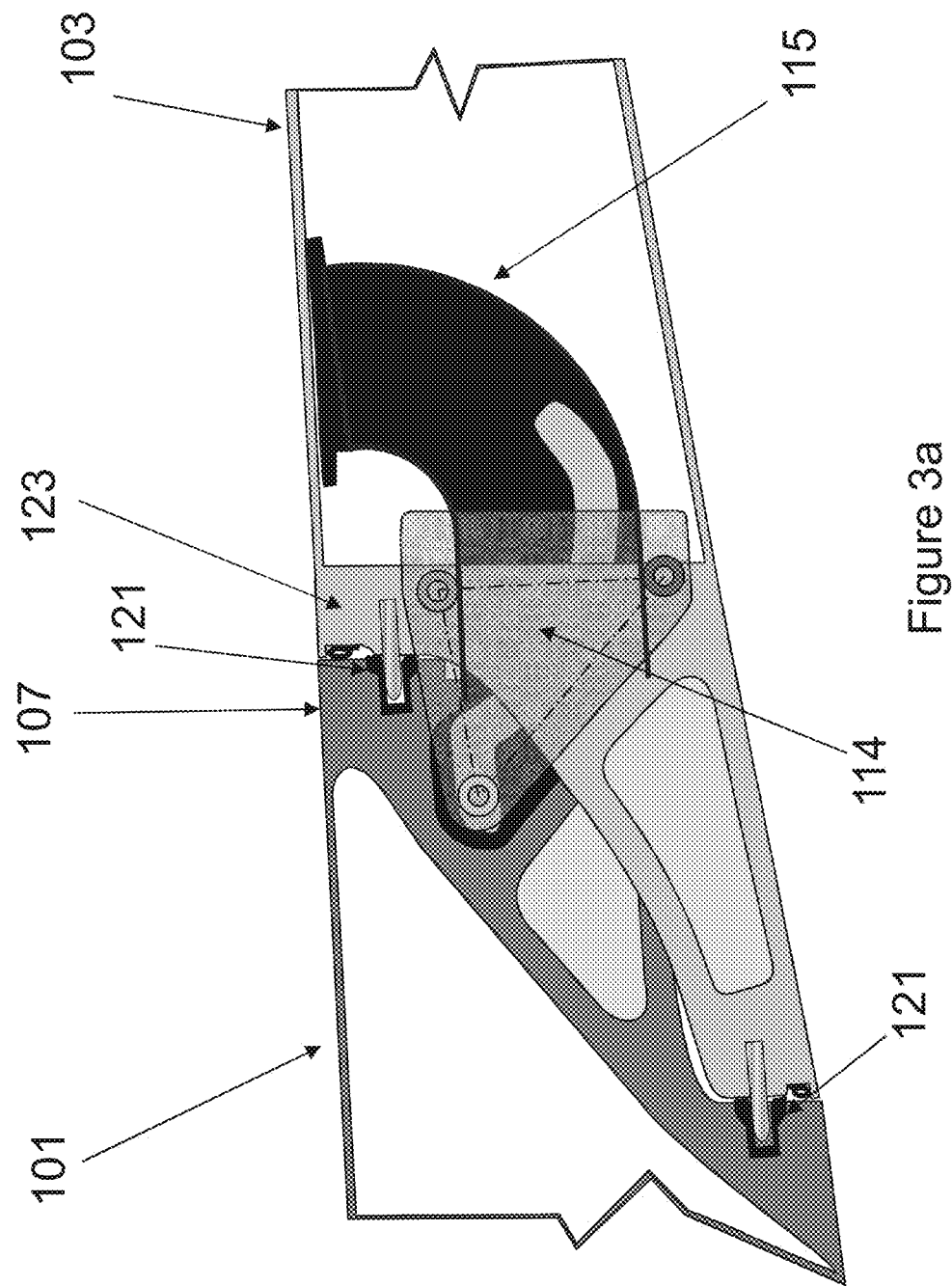
Figure 3C:
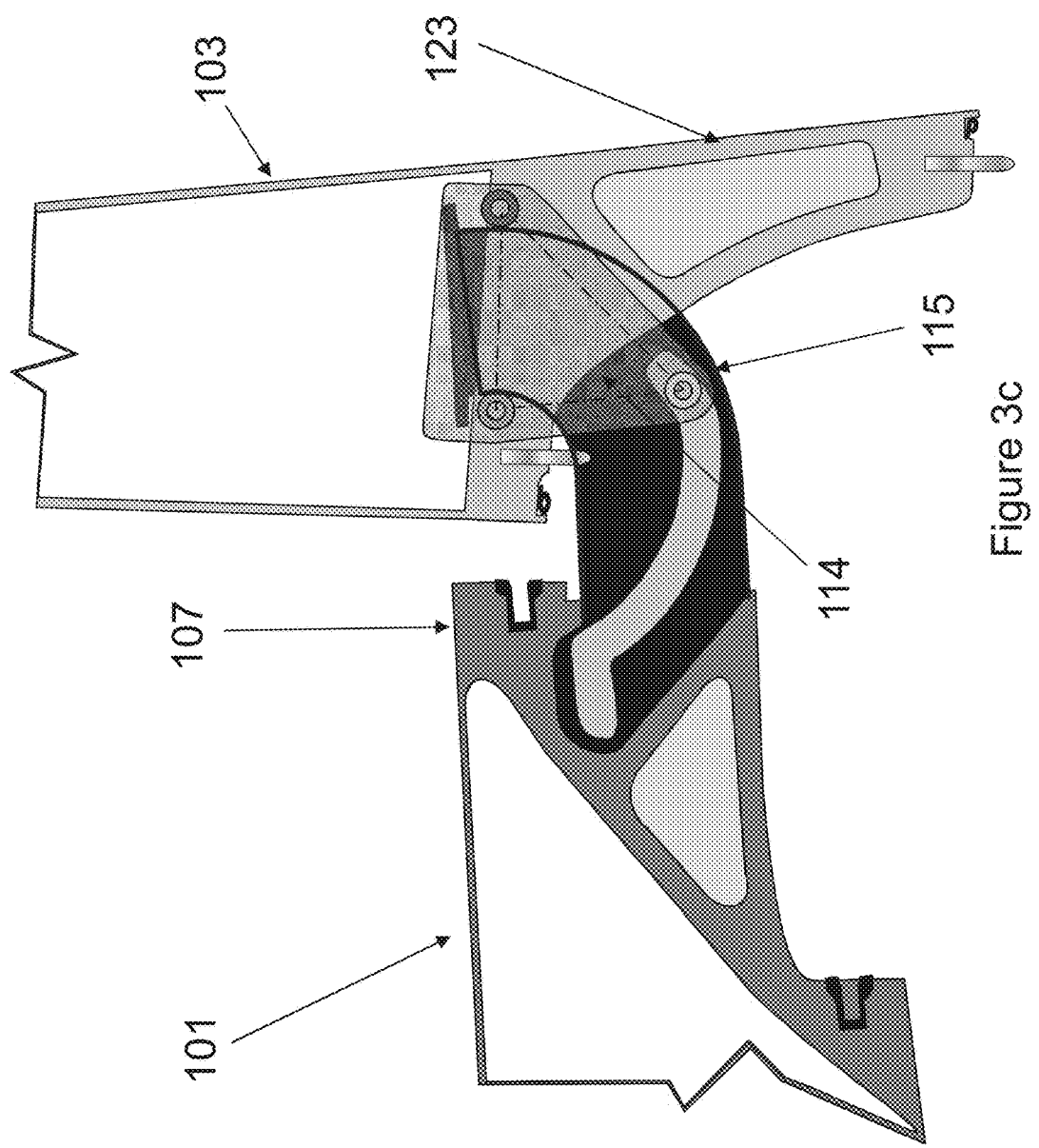

FIGS. 3a to 3c show a wing 101 and wing tip device 103 according to a second embodiment of the invention, moving from the flight configuration (FIG. 3a) to the ground configuration (FIG. 3c).

Features in the second embodiment of the invention that correspond to similar features in the first embodiment of the invention, are shown with the same reference numerals as in the first embodiment, but with the addition of the prefix '1' (or '10' where appropriate). For the sake of clarity, the actuator is not shown in FIGS. 3a to 3c. Also, only a selection of the reference numerals are shown.

The embodiment in FIGS. 3a to 3c is the same as that in FIGS. 1a-1h except for the differences described below.

Firstly, rather than a planar wing tip extension, the wing tip device 103 of the second embodiment of the invention is an upwardly extending winglet 103. For clarity, only the root portion of the wing tip device 103 is shown in the Figures.

Secondly, the end rib 107 of the wing 101 is a different shape to the rib 7 in the first embodiment. In contrast to the first embodiment, the lower edge of the rib 107 is recessed (from the upper edge) in a spanwise direction. The rib 107 thus extends diagonally from the upper wing surface to the lower wing surface. The spigots 121 are also at correspondingly different spanwise locations. The root rib 123 of the wing tip device 103 is a complementary shape (the lower edge of the rib 123 extending further inwards than the upper edge).

When the wing tip device 103 is in the ground configuration (FIG. 3c) a bending moment, caused by the weight of the wing tip device 103 acting around the proximal end of the rail 115, is reacted into the rib 107. When the wing tip device 103 is in the flight configuration (FIG. 3a) a bending moment, caused primarily by the aerodynamic loads on the wing tip device during use, is reacted into the rib 107 (via the spigots 121). This shape of the end rib 107, in which the lower edge is recessed relative to the upper edge, has been found to result in a beneficial stress distribution in the rib 107 when subjected to such a loading.

Figure 4:
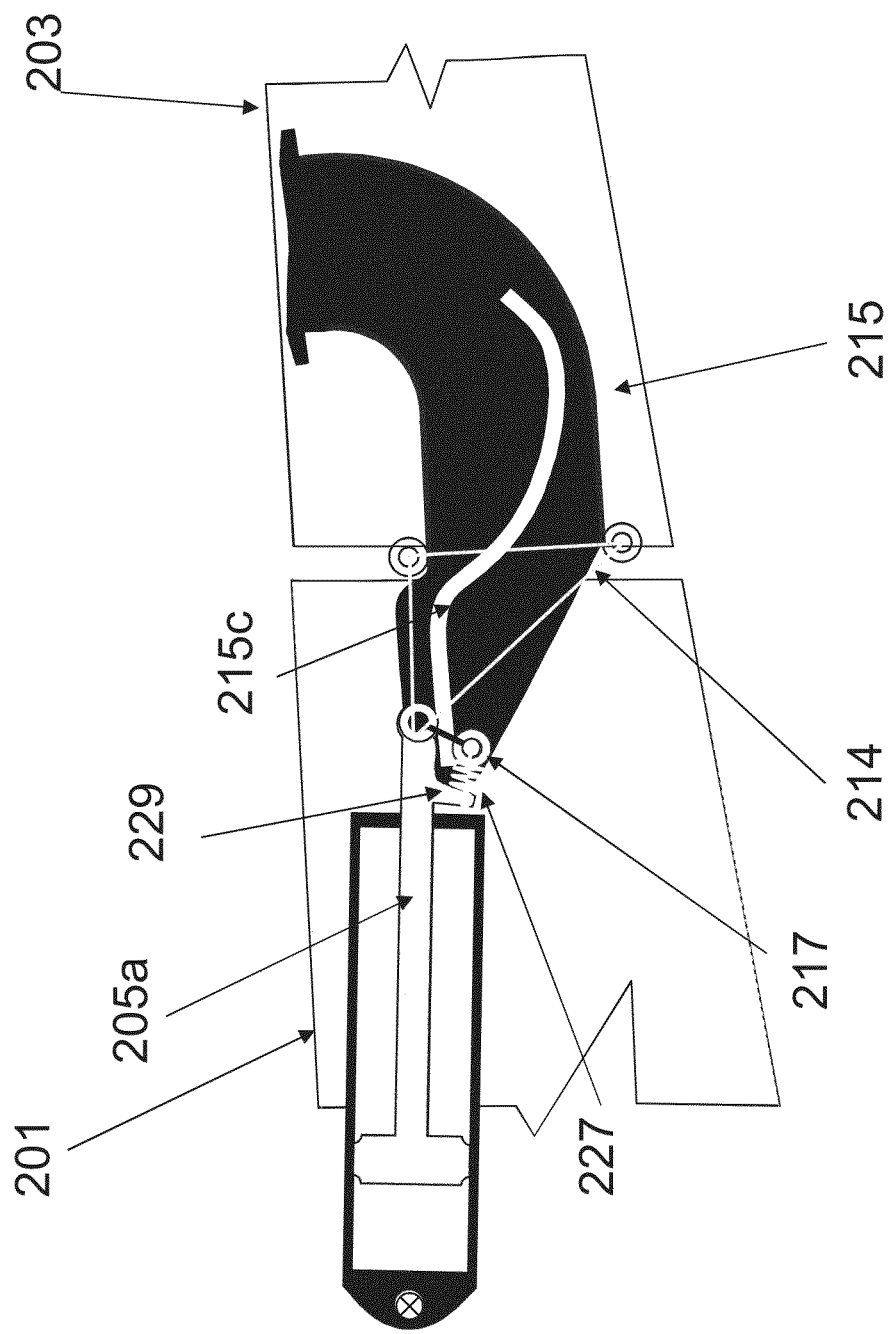
FIG. 4 is a schematic sectional side view of the wing and wing tip device according to a third embodiment of the invention, in the flight configuration.

FIG. 4 shows a wing 201 and wing tip device 203 according to a third embodiment of the invention, in the flight configuration.

Features in the second embodiment of the invention that correspond to similar features in the first embodiment of the invention, are shown with the same reference numerals as in the first embodiment, but with the addition of the prefix '2' (or '20' where appropriate). For the sake of clarity, only a selection of the reference numerals are shown in FIG. 4.

The embodiment in FIG. 4 is the same as that in FIGS. 1a-1h except that the slot 15c is replaced with a rail 215c for forming the third guide surface. To ensure the carriage 214 follows the shape of the rail 215, the contact 217 for moving along the third guide surface 215c comprises two wheels located either side of the rail 215c. The lower wheel is biased into position against the rail 215c by a spring 227 attached to a finger 229 on the end of the actuator rod 205a.

Whilst the present invention has been described and illustrated with reference to particular embodiments, it will be appreciated by those of ordinary skill in the art that the invention lends itself to many different variations not specifically illustrated herein. By way of example only, certain possible variations will now be described. A wing tip extension may be used with the arrangement in the second embodiment of the invention, and a winglet may be used with the arrangement in the first embodiment of the invention. In the above-described embodiments the carriage guide is a rail. However, in other embodiments the carriage guide may take alternative forms, such as comprising a combination of separate rails, slots, or grooves for receiving a carriage. In the above-mentioned embodiments, only one carriage guide, carriage and/or actuator is shown; it will be appreciated that the aircraft may however comprise further carriage guides, carriages and/or actuators as required for a given type and size of wing/wing tip device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, a wing tip device at the tip of the wing and an actuator, the actuator being arranged to effect movement of the wing tip device between:
   (i) a flight configuration for use during flight and
   (ii) a ground configuration for use during ground-based operations, in which ground configuration the wing tip device is moved away from the flight configuration such that the span of the aircraft is reduced,
   characterised in that the aircraft comprises:
      a carriage guide, fixed relative to the wing,
      a carriage arranged to move along the carriage guide as the wing tip device moves between the flight and ground configurations,
      wherein the carriage carries the wing tip device,
      the wing tip device is fixed relative to the carriage, such that the path of the wing tip device, during movement of the wing tip device, between the flight and the ground configurations, is defined by the shape of the carriage guide, and
      wherein the carriage guide is shaped such that the movement of the wing tip device between the flight and the ground configurations comprises both a rotational component of movement of the wing tip device and a translational component of movement of the wing tip device.

2. An aircraft according to claim 1, wherein the actuator is a linear actuator.

3. An aircraft according to claim 1, wherein the wing comprises an end rib at the tip of the wing, the end rib having an upper edge and a lower edge, and wherein at least part of the lower edge of the rib is recessed in a spanwise direction, relative to the upper edge.

4. An aircraft according to claim 1, wherein the carriage guide is shaped such that the movement from the flight configuration to the ground configuration comprises an initial phase of motion that comprises only a translational component of movement of the wing tip device.

5. An aircraft according to claim 4, wherein the carriage guide comprises a proximal end nearest the wing and a distal end farthest from the wing, and the carriage guide has a straight section at its proximal end, and a curved section extending from the straight section to the distal end.

6. An aircraft according to claim 1, wherein the carriage guide comprises an upper guide, a middle guide and a lower guide, and the carriage comprises corresponding upper, middle and lower contacts for moving along those respective guides.

7. An aircraft according to claim 6, wherein the carriage guide comprises a rail, the upper surface of the rail forming the upper guide, and the lower surface of the rail forming the lower guide.

8. An aircraft according to claim 7, wherein the rail comprises a slot located between the upper and lower surfaces, the slot forming the middle guide.

9. An assembly for attaching a wing tip device to an aircraft wing, the wing tip device being moveable between:
- (i) a flight configuration for use during flight and
- (ii) a ground configuration for use during ground-based operations, in which ground configuration the wing tip device is moved away from the flight configuration such that the span of the aircraft is reduced, wherein the assembly comprises:
- a carriage guide, for fixing relative to the wing,
- a carriage arranged to move along the carriage guide as the wing tip device moves between the flight and ground configurations,
- wherein wing tip device is fixable relative to the carriage, such that the path of the wing tip device, during movement of the wing tip device, between the flight and the ground configurations, is defined by the shape of the carriage guide, and
- wherein the carriage guide is shaped such that the movement of the wing tip device between the flight and the ground configurations comprises both a rotational component of movement of the wing tip device and a translational component of movement of the wing tip device.

10. A method of moving a wing tip device between a flight configuration and a ground configuration, wherein the method comprises the step of:
- moving a carriage along a carriage guide,
  - the wing tip device being fixed relative to the carriage such that the path of the wing tip device, during movement of the wing tip device between the flight and the ground configurations, is defined by the shape of the carriage guide, and
- wherein the carriage guide is shaped such that the movement of the wing tip device between the flight and the ground configurations comprises both a rotational component of movement of the wing tip device and a translational component of movement of the wing tip device.

* * * * *